(12) United States Patent
Aldrey et al.

(10) Patent No.: US 9,378,516 B2
(45) Date of Patent: Jun. 28, 2016

(54) CONTENT PROVISIONING FOR USER DEVICES

(75) Inventors: Raul I. Aldrey, Plano, TX (US); Donald H. Relyea, Dallas, TX (US); Michael John D'Argenio, Hoboken, NJ (US); Sok Y. Hwang, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 585 days.

(21) Appl. No.: 12/971,043

(22) Filed: Dec. 17, 2010

(65) Prior Publication Data

US 2012/0158514 A1    Jun. 21, 2012

(51) Int. Cl.
*G06F 21/00* (2013.01)
*G06Q 30/02* (2012.01)
*G06Q 30/06* (2012.01)

(52) U.S. Cl.
CPC ........ *G06Q 30/0269* (2013.01); *G06Q 30/0631* (2013.01); *G06Q 30/0643* (2013.01)

(58) Field of Classification Search
CPC .................................................. G06Q 30/0241
USPC ............................................ 705/59; 386/241
See application file for complete search history.

(56) References Cited

U.S. PATENT DOCUMENTS

| | | | | |
|---|---|---|---|---|
| 6,950,804 | B2* | 9/2005 | Strietzel | 705/26.8 |
| 8,707,343 | B2* | 4/2014 | Wong | G06Q 30/02 725/23 |
| 2002/0120564 | A1* | 8/2002 | Strietzel | 705/40 |
| 2004/0102987 | A1* | 5/2004 | Takahashi et al. | 705/1 |
| 2005/0229257 | A1* | 10/2005 | Kim et al. | 726/27 |
| 2007/0250445 | A1* | 10/2007 | Ache | H04N 5/76 705/51 |
| 2008/0092182 | A1* | 4/2008 | Conant | H04N 7/17318 725/109 |
| 2008/0154798 | A1* | 6/2008 | Valz | G06Q 30/02 705/400 |
| 2008/0270909 | A1* | 10/2008 | Kaufman | G06Q 20/12 715/738 |
| 2010/0138865 | A1* | 6/2010 | Rai et al. | 725/44 |
| 2010/0180289 | A1* | 7/2010 | Barsook et al. | 725/29 |
| 2011/0246661 | A1* | 10/2011 | Manzari et al. | 709/231 |
| 2011/0286716 | A1* | 11/2011 | Alderson | 386/230 |
| 2012/0093481 | A1* | 4/2012 | McDowell et al. | 386/241 |

* cited by examiner

*Primary Examiner* — Charles C Agwumezie

(57) ABSTRACT

A method including providing content for purchasing and viewing by users; providing at least one of an advertisement option, a replay option, or a content segment option pertaining to the purchasing and the viewing of a content; receiving a selection of content from a user; receiving a selection of the at least one of the advertisement option, the replay option, or the content segment option pertaining to the selected content; identifying a user device used by the user for viewing the selected content; sending the selected content to the user based on the identified user device; and displaying the selected content on the user device based on the selection of the at least one of the advertisement option, the replay option, or the content segment option.

20 Claims, 8 Drawing Sheets

CONTENT PROVISIONING FOR USER DEVICES

BACKGROUND

Consumer demand for media is increasing. For example, consumers often watch and/or listen to various media at home, while traveling, at work, etc. As a result, the number of communication channels for delivering media content and the number of different types of devices for playing the content has also increased.

DETAILED DESCRIPTION

Figure 1:
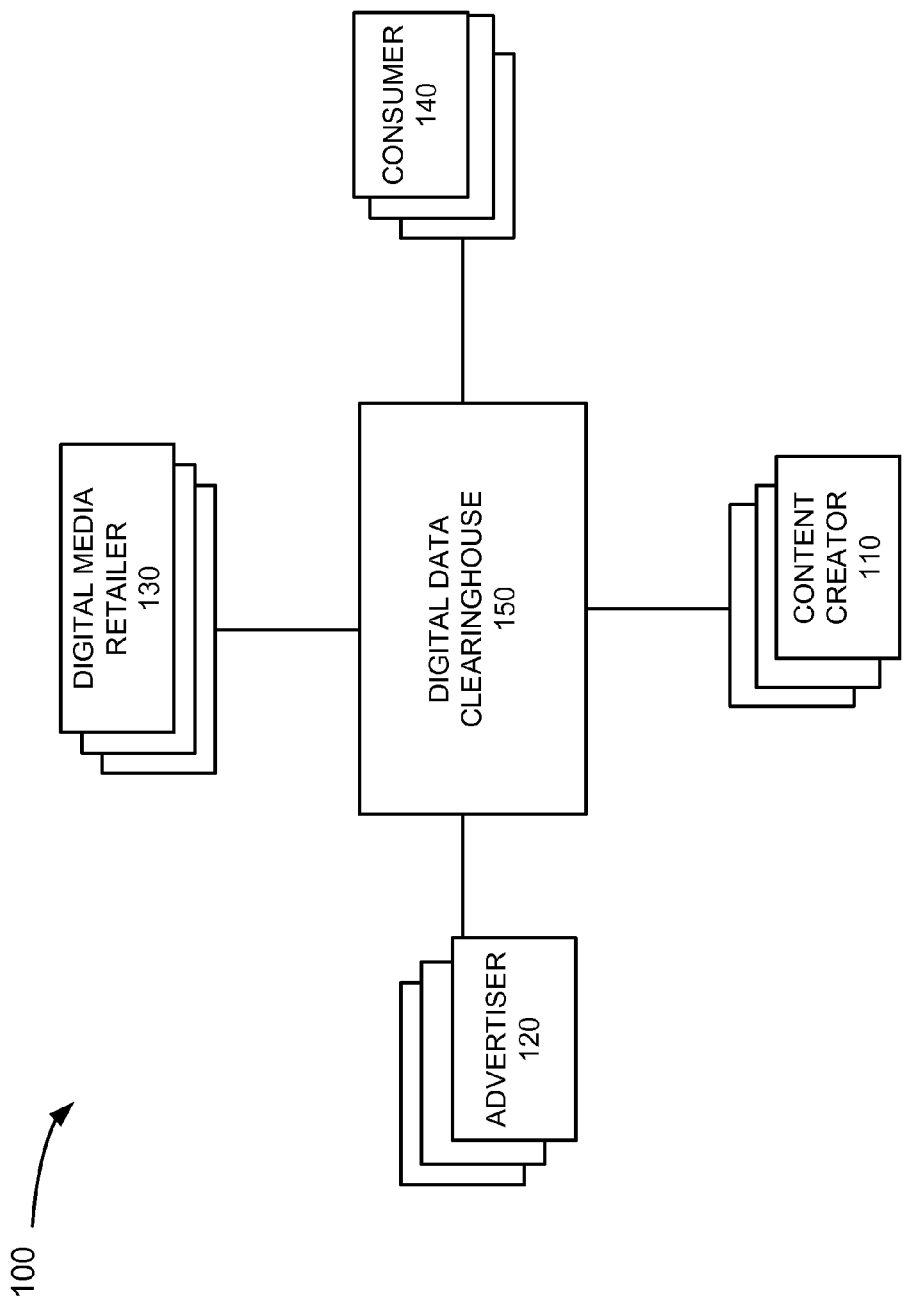
FIG. 1 is a diagram illustrating an exemplary network that includes a digital distribution clearinghouse (DDC) for processing content.

The following detailed description refers to the accompanying drawings. The same reference numbers in different drawings may identify the same or similar elements.

A digital data clearinghouse (DDC) may permit a user (e.g., a DDC operator, a DDC administrator, etc.) to define or create work units, use these work units to compose a work flow and, to dynamically provide for customer-requested processes for content distribution. When the user submits a service order for processing content on behalf of a customer, the DDC may obtain, from the work flow associated with a work order, work unit tasks that correspond to the work units. The DDC may perform all or some of these tasks.

The term "content," as used herein, may include for example, multimedia content (e.g., text-based content, audio and video such as a movie, a show, a television program, broadcast of a live event (e.g., sporting event, concert, etc.)), e-books, or another type of content or asset. Content may include, for example, time-shifted content, summaries of content, game content, episodic game content, and a segment of a full portion of content. Additionally, content may include user-generated content (e.g., videos, print, etc.).

The term "work unit," as used herein, may refer to a description of a set of one or more operations that the DDC may perform pertaining to the ingestion, transformation, and distribution of content. For example, the transforming of content may include overlaying subtitles on a video, inserting advertisements into a video, transcoding content from one format to another format, etc. A further description of a work unit is provided below.

The term "work flow," as used herein, may refer to one or more work units that may be executed to fulfill a work flow task associated with a work order. For example, a work unit may include an input and an output to permit a series of work units to form a processing path through which content may flow.

The term "work order," as used herein, may refer to an order (e.g., associated with a customer) that is received for processing by the DDC. A work order may include a work flow, criteria for the selection of the content to be processed in the work flow, and the parameter values for the work units pertaining to the work flow. For example, the parameters may include system parameters that may not be changeable, default parameters that may be changeable, and default parameters that may require human intervention (e.g., user verification, user entry, etc.).

The term "work unit task," as used herein, may refer to particular function or operation that may be performed based on a work unit. A work unit may perform one or more work unit tasks.

According to an exemplary scenario, assume that a user defines two work units via the DDC. Also assume that the first work unit describes reformatting an M×N video into a 600× 400 video, and the second work unit describes inserting an advertisement into the video. When a customer (e.g., a content creator, a content provider, etc.) places an order with the user to reformat the video into a 600×400 video and insert an advertisement in the video, the user may compose, through a graphical user interface (GUI) provided via the DDC, a work flow by concatenating two or more work units. When the user submits a work order, the DDC may schedule for execution a set of tasks that are associated with the work units included in the work flow. The DDC may then perform the tasks. The preceding example is provided for simplicity. Descriptions below provide additional details with respect to the DDC.

FIG. 1 is a diagram of an exemplary network 100 that includes a DDC for processing content. Referring to FIG. 1, network 100 includes one or more content creators 110, one or more advertisers 120, one or more digital media retailers (DMRs) 130, one or more consumers 140 and digital data clearinghouse (DDC) 150.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user-generated content (UGC), websites, blog sites, etc. Content creators 110 may provide content to DDC 150 for formatting (e.g., transcoding, etc.), packaging and/or distribution, as described further below.

Advertiser 120 (referred to collectively as advertisers 120 or individually as advertiser 120) may represent one or more parties that wish to insert advertising into content. For example, advertiser 120 may contract with a content creator 110 and/or digital media retailer 130 to insert an advertisement into a media stream provided to consumers 140. DDC 150 may insert the advertisement into the media stream in accordance with the agreement between the parties.

DMR 130 may represent one or more business entities that receive content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive content from DDC 150 and sell/provide the content to consumers 140.

Consumer 140 may represent one or more consumers 140 that receive content originally generated by or provided by content creators 110 and that has been processed by DDC 150. For example, DDC 150 may format and package the content for distribution by DMRs 130 and/or DDC 150 to consumers 140.

DDC 150 may include one or more devices (e.g., a server device, a computing device, etc.) for processing content. For example, as described above, DDC 150 may provide an automated environment in which content from content creators 110 is transformed and packaged for distribution in any number of formats, based on the particular requirements associated with DMRs 130. According to an exemplary embodiment, DDC 150 may also aggregate various data and insert advertisements into the content. DDC 150, consistent with embodiments described herein, may also utilize flexible work flows to streamline the formatting and packaging of content for digital distribution.

According to other embodiments, network 100 may include additional devices, fewer devices, different devices, and/or a different configuration than those illustrated in FIG. 1. For example, network 100 may include a large number (e.g., hundreds or thousands) of different types of user device associated with consumers 140, such as, for example, televisions, cellular phones, computers (e.g., laptops, desktops, tablets, notebooks, netbooks, etc.), personal digital assistants (PDAs), etc. Additionally, or alternatively, according to other exemplary embodiments, network 100 may include additional DDCs 150, etc. Additionally, or alternatively, network 100 may include one or more networks of various types to interconnect the devices illustrated in FIG. 1 and enable the devices to communicate with one another. For example, network 100 may include a public switched telephone network (PSTN), a local area network (LAN), a wide area network (WAN), the Internet, an intranet, or some other type of network. Network 110 may include wireless connections and/or wireless connections among the devices illustrated.

Also, according to other embodiments, one or more functions and/or processes described as being performed by a particular device or component may be performed by a different device or component, or some combination of devices or components. Additionally, or alternatively, according to other embodiments, one or more functions and/or processes described as being performed by multiple devices or multiple components may be performed by different devices or components, or a single device, etc.

Figure 2:
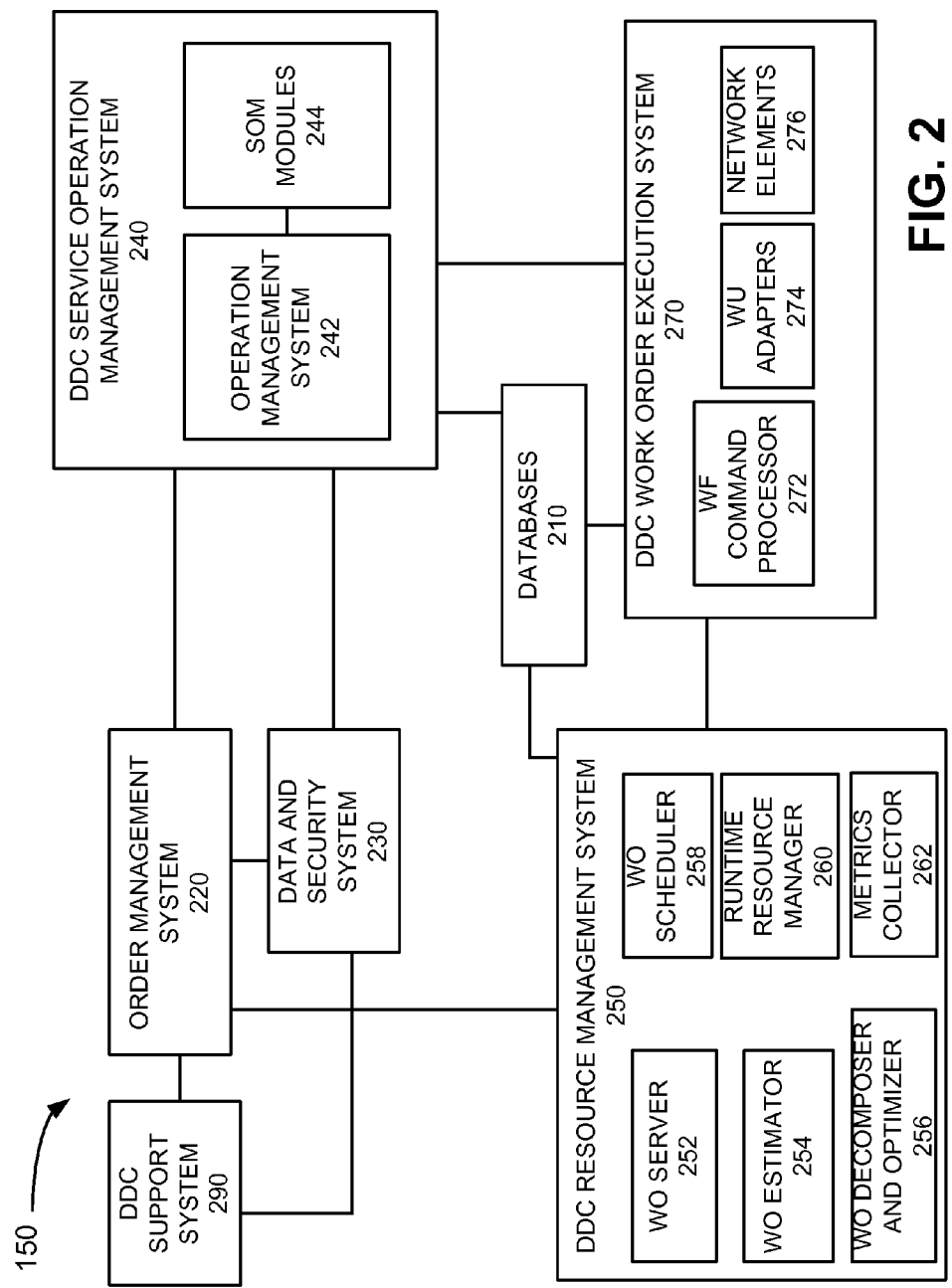
FIG. 2 is a diagram illustrating an exemplary embodiment of the DDC illustrated in FIG. 1.

FIG. 2 illustrates an exemplary embodiment of DDC 150. Referring to FIG. 2, DDC 150 may include databases 210, order management system 220, data and security system 230, DDC service operation management system 240, DDC resource management system 250, DDC work order execution system 270, and DDC support system 290.

Databases 210 may store work unit definitions, work flows, parameters, tables, etc., that are associated with various devices, components, etc., in DDC 150, intermediate or end results of processing performed by different processes in DDC 150, etc.

Order management system 220 may include one or more devices (e.g., a server device, a computing device, etc.) for managing customer orders, generating reports, etc. According to an exemplary embodiment, order management system 220 may include client components that interface with components of DDC service operation management system 240. The client components (e.g., web browser) may receive customer orders, requests for reports, etc., and relay the received information to the components of DDC service operation management system 240 for the creation, validation, estimation, submission, approval, execution and reporting of activities associated with the customer orders, request for reports, etc. For example, a customer order may be completed by sending, to a component of DDC service operation management system 240, a selection of a particular work flow that will drive the processing of content associated with the order.

Data and security system 230 may include one or more devices (e.g., a server device, a computing device, etc.) to provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose work flows. According to an exemplary embodiment, data and security system 230 may interface with order management system 220, DDC service operation management system 240, and DDC support system 290.

DDC service operation management system 240 may include one or more devices (e.g., a server device, a computing device, etc.) to control an overall operation, configuration, and management of DDC 150. For example, DDC service operation management system 240 may include operation management system 242 and service operation management modules 244. Via a client component that communicates with operation management system 242, a user may control the configuration, administration and operation of DDC 150. For example, in one implementation, via a web browser or another client application, a user may control security, compose a work flow, administer accounts that are associated with content creator 110 or DMR 130, submit a work order, add data to storage of DDC 150, manage resources, manage DDC configuration (e.g., create a work unit), manage catalogs of content, run reports, monitor DDC work orders (e.g., information associated with a work order), etc.

In providing each of such services to a client, operation management system 242 may employ service operation management (SOM) modules 244. SOM modules 244 may include components that correspond to the above-listed services. For example, SOM modules 244 may include a security manager, a work flow manager, an account manager, a work order manager, a data and storage manager, a resource management module, a configuration manager, an asset management module, a catalog management module, a monitoring and reporting module, etc. DDC service operation management system 240 may further include a graphical user interface (GUI) for interfacing with SOM modules 244.

DDC resource management system 250 may include one or more devices (e.g., a server device, a computing device, etc.) that support the capacity management of resources associated with network elements (NEs) of DDC 150. As illustrated in FIG. 2, DDC resource management system 250 may include a work order server 252, a work order estimator 254, a work order decomposer and optimizer 256, a work order scheduler 258, a runtime resource manager 260, and a metrics collector 262.

Work order server 252 may provide work order-related interfaces to operation management system 242 and/or SOM modules 244, and may communicate with work order estimator 254, work order decomposer and optimizer 256, and work order scheduler 258 to submit, decompose, validate, and save work orders, and to estimate, schedule, and reserve resources during an order submission.

Work order estimator 254 may estimate the cost of completing a decomposed work order across work units of a work flow, based on resources that are associated with the work units for each resource type. Work order estimator 254 may store the cost in one of databases 210 in terms of resource capacity units (RCUs) and duration of time required to complete work unit tasks, sub-work unit tasks, processes, etc., which may pertain to the execution of the work order. The term "RCU", as used herein, may include a unit of measure for a resource type. For example, an RCU may correspond to bits per second, tasks per hour, CPU processing time, etc., or some other type of quantity of unit (e.g., capacity unit) by time (e.g., a time unit, such as, hour, minute, second, millisecond, etc.), quantity of unit (e.g., gigabyte (GB) for storage, megabits for bandwidth, etc), etc.

Work order decomposer and optimizer 256 may break down an order into work units based on the work flow associated with the order. Furthermore, based on the decomposition, work order decomposer and optimizer 256 may generate work unit tasks, or simply "tasks," assign work unit task parameters, create work unit task connectors, etc., which are described further below.

Work order scheduler 258 may match cost estimates for different resource types for a work order to available time slots in an allocation schedule across different network elements (e.g., hardware/software components that perform underlying operations for a work unit). As a result of the scheduling, work order scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous actual execution measurements, metrics collector 262 may modify factors that are used to estimate the resource and time necessary to complete a task associated with a work unit for a particular content.

DDC work order execution system 270 may include one or more devices (e.g., a server device, a computing device, etc.) to manage the flow and execution of work units of a defined work flow associated with a work order. DDC work order execution system 270 may include a work flow command processor 272, work unit adapters 274, and network elements 276. For simplicity, FIG. 2 does not illustrate other components of DDC work order execution system 270. For example, DDC work order execution system 270 may include a work unit processor (not illustrated). Depending on the implementation, DDC work order execution system 270 may include additional, fewer, or different components than those illustrated in FIG. 2.

Work flow command processor 272 may drive work order execution. According to an exemplary embodiment, work flow command processor 272 may include a work order manager, a work order processor, and a work unit processor (not illustrated). The work order manager may provide interfaces to resource management system 250 for initiating an execution of a work order, retrieving the status of the work order, suspending/resuming the work order execution, canceling the work order, etc. The work order processor may coordinate work unit tasks for completion of a work order. In coordinating different work unit tasks, the work order processor may sequence the tasks for optimum execution time and resource utilization. The work order processor may communicate with runtime resource manager 260 for allocation and de-allocation of resources. The work unit processor may dispatch processes/threads to perform a work unit task.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for ingesting, transforming, and distributing content.

DDC support system 290 may include one or more devices (e.g., a server device, a computing device, etc.) and/or personnel to provide support services, such as creation of work units, composition of work flows, etc., billing support, contracting management, pricing, etc.

According to other embodiments, DDC 150 may include additional, fewer, different, and/or a different arrangement of devices than those illustrated in FIG. 2. The configuration shown in FIG. 2 is for illustrative purposes. In other configurations and/or implementations, functions that are associated with one component illustrated in FIG. 2 may be performed by one or more other components in FIG. 2; any of the components may be connected to any other of the components; and functions of one component may be included in another component. Accordingly, in the other configurations or implementations, DDC 150 may include additional, fewer, different, or a different arrangement of components than those illustrated in FIG. 2. For example, according to an exemplary embodiment, DDC resource management system 250 may include a component for providing reports on resources, schedules, metrics, etc.

As previously described, DMR 130 may represent one or more business entities, service providers, etc., that receives content (e.g., from DDC 150, advertiser 120, etc.) and resells it to users (e.g., consumers 140, etc.). Users may view the content on a user device. However, conventional approaches provide the user with limited options pertaining to the content available. For example, the user may not be able to purchase (e.g., buy to own, rent, etc.) and/or view a segment of a television show, a movie, etc., (e.g., the first 10 minutes, the last 10 minutes, etc.) or a condensed version or a summary (e.g., a recap, etc.) of the television show, the movie, etc. Additionally, the user may not have any control when purchasing and/or viewing content as to whether the content will include advertisements (ads). For example, the user may not have an opportunity to purchase and/or view content in an a-la-carte fashion (e.g., content with ads, content without ads, content with replay capability, content without replay capability, etc.). There are other drawbacks pertaining to the way content may be purchased and/or viewed by users according to conventional approaches. For example, users do not have the opportunity to self-provision bundles of content. For example, the user may not be able to purchase and/or view particular television channels or content pertaining to a television package.

According to exemplary embodiments described herein, a content provisioner may provide users with various services and functionalities pertaining to the purchasing, viewing, and managing of content. According to an exemplary embodiment, a user device may include a content provisioner. Additionally, according to an exemplary embodiment, a DMR device may include a content provisioner.

Figure 3:
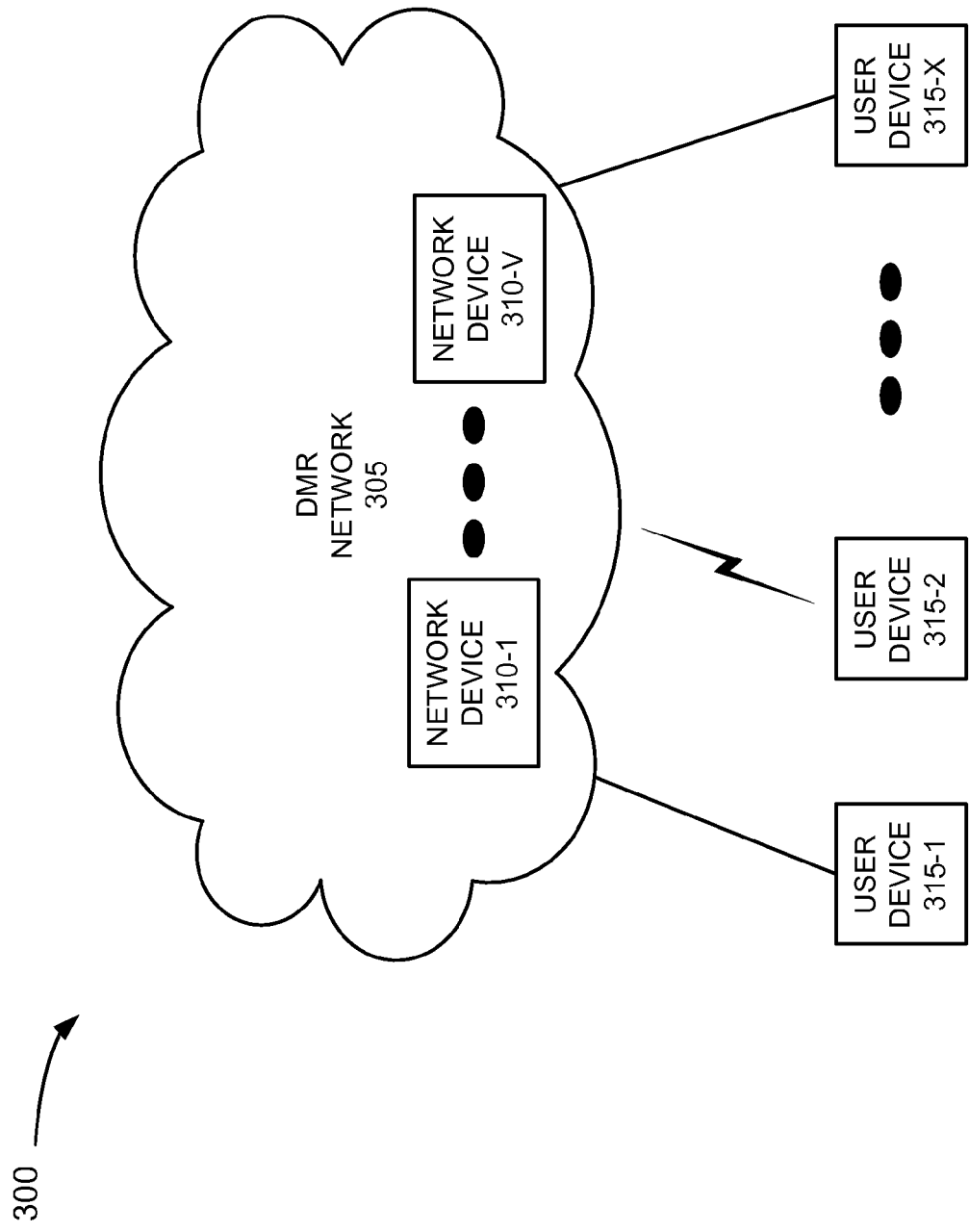
FIG. 3 is a diagram illustrating an exemplary environment 300 that includes a content provisioner according to an exemplary embodiment.

FIG. 3 is a diagram illustrating an exemplary environment 300 that includes a content provisioner according to an exemplary embodiment. As illustrated, environment 300 may include a DMR network 305 that includes network devices 310-1 through 310-V (referred to collectively as network devices 310 and individually as network device 310), and user devices 315-1 through 315-X (referred to collectively as user devices 315 and individually as user device 315).

DMR network 305 may include one or multiple networks of any type. For example, DMR network 305 may correspond to a WAN, a LAN, a metropolitan area network (MAN), a wireless network, a wired network, a Public Land Mobile Network (PLMN), a television network, the Internet, an intranet, and/or some other type of network. DMR network 305 may store or have access to content. As described herein, the content may be provisioned to users via user devices 315.

Network device 310 may include a device capable of communicating with devices, networks, systems, components, etc. For example, network device 310 may correspond to a computational device (e.g., a computer, etc.), a server device, a peer device, a routing device, and/or some other type of network device. According to an exemplary embodiment, network device 310 may include a content provisioner that provides various services and performs various functions as described herein.

User device 315 may include a mobile device, a stationary device, a handheld device, a tablet device, or a portable device. For example, user device 315 may correspond to a computational device (e.g., a desktop computer, a laptop computer, a palmtop computer, a notebook computer, a tablet computer, etc.), a communication device (e.g., a wireless phone, a wired phone, an Internet-access device, etc.), a gaming device, a location-aware device, a multimedia device (e.g., a music playing device, a video playing device, etc.), a data organizing device (e.g., a personal digital assistant (PDA), etc.), a television, a set top box, and/or some other type of user device. According to an exemplary embodiment, user device 315 may include a content provisioner that provides various services and performs various functions as described herein.

The number of devices and networks, and configuration in environment 300 is exemplary and provided for simplicity. In practice, environment 300 may include additional devices, fewer devices, different devices, and/or differently arranged devices, than those illustrated in FIG. 3. Additionally, or alternatively, in practice, environment 300 may include additional networks and/or differently arranged networks, than those illustrated in FIG. 3. Also, one or more functions and/or processes described as being performed by a particular device may be performed by a different device, or some combination of devices, according to other embodiments. Environment 300 may include wired and/or wireless connections among the devices illustrated. By way of example, the connections may include cable, fiber optic, wireless, etc. Additionally, environment 300 may operate according to one or multiple communication standards, protocols, etc.

According to exemplary embodiments, the content provisioner of network devices 310 and the content provisioner of user devices 315 may communicate to provision the delivery of content to users and provide other various services, functions, etc., described herein. For purposes of description, the content provisioner of network devices 310 and the content provisioner of user devices 315 may be referred to as the "content provisioner."

According to an exemplary embodiment, the content provisioner of user device 315 may be device-agnostic. For example, the content provisioner may be installed on or operated by various user devices 315. Additionally, the content provisioner of user device 315 may support various content types (audio, video, television, print, photography, etc.), various formats, etc., in terms of viewing content, etc.

According to an exemplary embodiment, the content provisioner may permit the user to configure user preferences and to enter information to receive content and personalized recommendations (e.g., content, advertisements, etc.) pertinent to his/her self-identified preferences. By way of example, the user may provide his/her birth date, favorite genres, favorite movies, favorite actors, favorite commercials, favorite colors, and/or hobbies. The user may also provide login information to social networking sites or other web sites to allow the content provisioner to obtain relevant information associated with the user and provide various services, etc., to the user. Additionally, with the user's permission, the content provisioner may automatically import various types of information (e.g., user information, user photos, etc.) from social networking accounts (e.g., Facebook, etc.) or other web sites to be used in creating his/her content provisioning account. The content provisioner may also obtain information (e.g., device identifier, telephone number, media access control (MAC) address, etc.) that identifies user devices 315 that the user will be using.

According to an exemplary embodiment, the content provisioner may provide for an individual login. For example, user devices 315 (e.g., set top box, television, computer, etc.) may be accessible to multiple users. In this way, various services and/or functions may be targeted to a particular person or persons compared to a particular household, a particular device, etc. For example, the content provisioner may identify the user automatically or based on the user's input. For example, according to an exemplary scenario, a user launches the content provisioner on a television that includes a dongle or a wireless transceiver. The user may have a handheld device (e.g., a smartphone, etc.) on his/her person. The content provisioner may automatically detect a Bluetooth identifier of the handheld device and recognize that the Bluetooth identifier is associated with the user. In this scenario, it may be assumed that the user previously provided the Bluetooth identifier to the content provisioner during a set-up process. The content provisioner may automatically login the user with the content provisioner based on the detection of the Bluetooth identifier. According to an exemplary embodiment, user device 315 may include remote control functionality for a television, etc. Based on device interaction (e.g., communication), an identity of the user may be obtained (e.g., a mapping between a device identifier associated with user device 315, etc.). Alternatively, for example, the user may provide the content provisioner with a user name, password, etc., as a means to manually login to the content provisioner. According to other scenarios, the content provisioner may automatically login the user based on other known circumstances or information. For example, if the user is the only user in a residence or if user device 315 is used only by one person (e.g., a mobile phone, etc.), the login of the user may be automatic.

Based on the individual login, the content provisioner may provide a personalized GUI for the user to, among other things, manage a content library (e.g., content bought, content rented, etc.), receive personalized recommendations (e.g., content, ads, promotional offers, etc.), search content, select content, purchase content, view content, interact with advertising, add news feeds, add dashboards to social networking accounts (e.g., Facebook, Twitter, Friendster, MySpace, Jaiku, etc.), send and receive messages, etc., as described further below. The user may customize his/her GUI based on various user-selectable preferences.

As previously described, the content provisioner may be device-agnostic. According to an exemplary embodiment, the customizable GUI of the content provisioner may be provided to the user across multiple user devices 315 associated with the user. For example, assume that the user initially sets-up the content provisioner on his/her television. In this scenario, when the user launches the content provisioner on his/her mobile phone, the GUI may have the same arrangement, user preferences, etc., as that of the GUI of the content provisioner associated with the television, unless the user specifies otherwise. For example, the menu system or other GUI components may be automatically optimized for the smaller screen of the mobile phone to permit the user to do all of the same things the user could do on his/her television. Additionally, the user's content library, etc., may be the same as the content library when using his/her television.

According to an exemplary embodiment, the content provisioner may provide the content to the user in an optimal way based on user device 315 (e.g., device characteristics, such as display capabilities, etc.) and/or connection capacity and availability between network device 310 and user device 315. For example, the content provisioner of network device 310 may automatically detect a network connection capacity between network device 310 and user device 315. The content provisioner of network device 310 may then automatically select a resolution for the content that is compatible with the network connection capacity detected and user device 315 (e.g., whether user device 315 is capable of displaying high-definition, standard definition, 3-dimensional, etc.).

According to an exemplary embodiment, the content provisioner of network device 315 may provide personalized recommendations of content to a user via the content provisioner of user device 315. For example, based on the user's behavior (e.g., content purchased, content viewed, content searches, interaction with ads, rankings of content, recommendations to other users, etc.), usage patterns (e.g., time of usage, frequency of usage, location of usage, user device 315 used, etc.), self-identified attributes (e.g., user profile information, user preferences, user-voting of content, etc.), other users behavior (e.g., friends of the user, other users of the content provisioner, etc.), the content provisioner may provide to the user, for example, personalized recommendations of content, promotional offers, and ads that may be of interest to the user.

According to an exemplary embodiment, the content provisioner of network device 310 may generate personalized recommendations of content, etc., based on one or multiple user devices 315 associated with and/or used by the user. For example, the user's behavior, usage patterns, etc., may be ascertained when the user is using his/her mobile phone, laptop, and television, thus providing the content provisioner a gestalt perspective of the user. According to an exemplary embodiment, the content provisioner of network device 310 may include a recommendation system (e.g., an artificial intelligence (AI)-recommender, etc.) and a user tracking system (e.g., to track user behavior, usage patterns, data mining, etc.).

For example, according to an exemplary scenario, a user may be a fan of the sci-fi genre. On a particular day, the user purchases and views the movie entitled "Total Recall" via his/her television. Based on this purchase, the content provisioner recommends to the user, while the user is using his/her desktop computer, other movies, such as Terminator, Terminator 2: Judgment Day, and Terminator 3: Revenge of the Machines, which are in the sci-fi genre and star Arnold Schwarzenegger. The user selects to preview Terminator 3: Revenge of the Machines. During the previewing, a popup ad may appear that indicates that the user may rent the movie for 5 hours for $2.00. In this example, the content provisioner may take into consideration the user's behavior, usage patterns, etc., pertaining to the user's use of his/her television, as well as the user's use of his/her desktop computer. For example, on Saturdays, the user typically spends about 5-6 hours on his/her desktop computer. In this example, the user accepts the offer of the ad and views Terminator 3: Revenge of the Machines.

According to an exemplary embodiment, the content provisioner may permit the user to make a-la-carte content purchases and provide flexible purchasing options. For example, unlike conventional television service subscriptions that limits a user's access to pre-selected combinations of channels included with a particular television package that typically includes channels in which the user is not interested, the content provisioner may permit the user to purchase content without such limitations. By way of example, according to an exemplary scenario, the user may wish to purchase and view the season finale of Dancing With The Stars. The content provisioner may provide the user with the following purchasing options: purchase the show with ads ($0.00); purchase the show without ads ($1.00); purchase the show with replay capability for a month ($5.00); purchase the show and the season's preceding episodes with the musical soundtrack ($30.00); or host a virtual event with friends ($click to see price options). In this way, the user may purchase only the content that he/she will view. A further description for hosting a virtual event is provided below.

According to another exemplary scenario, the user may be traveling in the morning time to his/her work on the subway and wishes to purchase and view the first 12 minutes of his/her favorite television show, without ads, since the trip to work takes approximately 15 minutes. During the return home, the user may wish to purchase and view the remaining 12 minutes of his/her favorite television show without ads. The content provisioner may provide the user with various options pertaining to advertisements, replay, and content segment. The user may then select, for example, the appropriate content, without replay and advertisements, for his/her trip to and from work.

As previously described, according to an exemplary embodiment, the content provisioner may permit the user to self-provision content bundles. The user may purchase content bundles (e.g., combinations of content, combinations of channels, etc.) similar to that of a standard television service. In this way, the user may not unnecessarily purchase content that is included with a particular channel, content bundle, etc. For example, according to an exemplary scenario, a user may self-provision for the purchasing and viewing of 10 hours of premium channel content (e.g., HBO, Starz, etc.) without a monthly subscription to the premium channel(s). According to another exemplary scenario, the user may self-provision a combination of television channels for the purchasing and viewing without having to subscribe to a particular television package that includes the combination of television channels as well as other television channels in which the user has no interest. According to yet another exemplary scenario, assume the content provisioner recognizes that the user enjoys the drama genre. The content provisioner may customize bundles based on the user's preferences. For example, the user may be offered a classic drama bundle, a new age drama bundle, and a premium drama bundle, which may be bundles the content provisioner generated specifically in the drama genre. The user may select one of the offered content bundles. In accordance with these exemplary scenarios, the content provisioner may provide the user with pricing options for the self-provisioned content bundles.

According to an exemplary embodiment, the content provisioner may use search algorithms rather than hard-coded menu structures to permit the user to perform content searches. According to an exemplary embodiment, DDC 150 may include metadata with content that may facilitate the searching of content (e.g., ontological search, etc.). For example, according to an exemplary scenario, a user may decide to browse his/her content library and add some content. The user may select a search option to begin a keyword search. The user may view a search screen, which may contain a search box and the playing of previews of content that are being offered. The user enters the text "dancing." A search engine refreshes a screen with the initial search results that match the user's keyword search. In addition to the search results, the screen may include the following exemplary questions or links, such as dance competition; cultural dances around the world; dance moves, and how to dance. The user may click on the dance competition question or link to narrow his/her search. The screen is refreshed with a new set of search results based on his/her input. Again, the search engine provides questions or links to narrow the user's search. For example, the following exemplary questions or links may include: traditional dance; ballroom dance; and hip-hop dance. In this example, the user may select ballroom dance and the search engine may refresh the search results. The search engine provides another set of questions or links to further narrow the user's search. For example, the following exemplary questions or links may include: television shows—competitive ballroom dance; how to ballroom dance; and ballroom music. The user may select television shows—competitive ballroom dance and the search engine may refresh the search results. The search results may include Dancing With The Stars and content pertaining to the television show (e.g. seasons, episodes, etc.) are provided to the user. The user may select from the content. As described, although the user may have initially typed "Dancing With The Stars" in his/her original search, in the event that the user does not know the title of content or other content-specific parameter, the user is able to locate the content based on a narrowing search of the available content According to an exemplary embodiment, the content provisioner may permit the user to view content across multiple user devices 315. For example, according to an exemplary scenario, assume the user is watching a movie on his/her television. About half-way through the movie, the user may need to travel to a relative's residence. The user may pause the movie on his/her television. The user may take his/her mobile device with him and has his/her spouse drive to the relative's residence. During the drive, the user may continue to watch the movie from the point in time in which the movie was previously paused on his/her television. According to an exemplary embodiment, the content provisioner may include a session management system to manage a content viewing session and allow the user to pause and resume content across multiple user devices 315.

According to an exemplary embodiment, the content provisioner may automatically recognize user-dissatisfaction of content. For example, according to an exemplary scenario, a user may purchase a movie and may begin to view it. After five minutes of viewing, the user stops the playing of the content. Recognizing that the user only viewed the movie for five minutes, the content provisioner asks the user if he/she would like to keep the purchased movie or receive a refund. The user may opt to receive the refund. The user's account is credited with the purchase price of the movie.

According to an exemplary embodiment, the content provisioner may provide for post-consumption voting and recommendations to other users. For example, according to an exemplary scenario, the user may finish the viewing of content. Thereafter, the content provisioner may invite the user to select from a ranking range of 1-5. The content provisioner may provide the user's ranking of the content to a user behavior database. Additionally, the content provisioner may permit the user to recommend the content to other users (e.g., friends, relatives, etc.). For example, if the user views the content and likes it, the content provisioner may automatically generate a message and automatically send and post the message to a social networking site to allow the user's social-networking friends (e.g., the user's Facebook friends, the user's relatives, etc.) to view the message. For example, the message may indicate that the user viewed the content, liked the content, and encourages his/her friends to view the content. Alternatively, the user may create the message and the content provisioner may send and/or post the message to the user's destination(s). The user may configure user-preferences pertaining to the disclosure of the user's post-consumption voting, recommendations, etc.

According to an exemplary embodiment, the content provisioner may permit the user to set up a virtual event. In this way, users may build communities based on content. According to an exemplary embodiment, the content may be purchased content or user-generated content (e.g., a YouTube video, etc.). Additionally, or alternatively, the content may be content that one or more of the attendees would not otherwise be able to view if not for the attending of the virtual event (e.g., due to a user's subscription with the DMR 130, etc.). According to an exemplary scenario, the content provisioner may provide a user with an option to host a virtual event. The user selects the option and a screen appears with a list of the user's friends, relatives, etc., (e.g., Facebook friends, other users, etc.). The user selects some friends that he/she would like to attend the virtual event. The user may then be presented with several payment options to invite his/her friends to view the content. For example, the payment options may include a pay-your-own-way option, a host-pay option, a special offer option. For example, under the pay-your-own way option, each user may receive an invitation via Facebook or his/her content provisioning home page and, if the invitation is accepted, each user is required to pay a fee to join the virtual event. Under the host-pay option, the user hosting the virtual event may pay for all of his/her friends to attend the virtual event. Under the special offer option, each user may watch a series of ads and participate in a survey. In turn, the virtual event may be free.

In this example, assume that the user selects the host-pay option. A dialogue box may appear confirming the transaction. Subsequently, the content provisioner may automatically generate an invitation message or the user may author an invitation message. The automatically generated message may include, for example, the name of the host, the content to be viewed, the time and day of the viewing, and information pertaining to payment. Once the invitation message is created, the invitation message may be sent (e.g., automatically by the content provisioner or based on an input from the user) to the user's friends previously indicated by the user. For example, the invitation message may correspond to an instant messaging (IM) message, an e-mail, a short messaging service (SMS) message, a multimedia messaging service (MMS) message, etc, or through a social networking site (e.g., a post to a Facebook page, etc.). In this scenario, the user's friends may accept the invitation. The content provisioner may store the content in each of the user's content library or provide to the users at the appropriate viewing time. The content may be played or viewed by the participants of the virtual event when the virtual event occurs (e.g., on a particular day and time).

According to an exemplary embodiment, the content provisioner may allow interaction between users during a viewing of content. For example, according to an exemplary scenario, users may be viewing content during a virtual event. In one part of the screen, the content may be playing and in another part of the screen there may be a video chat window so that the user can see other users that are attending the virtual event.

Additionally, or alternatively, another part of the screen may include a text chat box to allow real-time interactive conversation between the user and the other users attending the virtual event. When the virtual event concludes, the other users may be offered the opportunity to permanently add the content to their respective content libraries (e.g., if the content was rented versus purchased, the other users may need to pay more monies) or see other content the user has viewed and recommended. According to an exemplary embodiment, the other users may be able to preview recommended content and decide whether they wish to purchase the content and add the content to their content libraries.

According to an exemplary embodiment, the content provisioner may permit the user to connect with various social networking sites. For example, according to an exemplary scenario, the user may be viewing content. During this viewing, an interactive bug may appear asking if the user would like to update his/her status. The user may accept and an overlay may appear that allows the user to enter text. For example, the user may state that he/she is watching Iron Man 2 with some friends. The user's message may be posted to various social networking sites (e.g., Facebook, Twitter, etc.) or other types of web sites. The user's message may include a screenshot from Iron Man 2. The user may then see a dialogue box confirming that the user's message has been posted and then the dialogue box may automatically close or dissolve away. Alternatively, the content provisioner may automatically generate and post a status update message to the user's social network site(s) when the user begins the viewing of the content. For example, the status update message may indicate the user is watching particular content for a time period corresponding to the length of the content. In response to the user's message (or the status update message) others may decide to respond to the user's post. For example, the user's friend may post a response. The content provisioner may provide the user with his/her friend's response in a dialogue box so that the user may continue to view the content while still being able to review his/her friend's response.

According to an exemplary embodiment, the content provisioner may provide dynamic ad insertions, which may be contextual and/or personalized, and provide the dynamic ads to the user. For example, according to an exemplary scenario, during a user's use of the content provisioner, an interactive ad appears that includes a movie trailer pertaining to a genre in which the user is interested. The ad also includes an invitation to purchase movie tickets for the opening of the recommended movie. In this example, it may be further assumed that the content provisioner is also aware of the location of the user based on conventional methods (e.g., cell ID, triangulation, Global Positioning System (GPS), device identifier (e.g., for stationary devices, etc.), etc.). The ad permits the user to select a theater in his/her current area, as well as a showtime. In this example, the user declines the offer. However, during the end of the movie trailer, a dynamically inserted ad appears asking the user whether he/she is interested in a pair of glasses worn by one of the actors appearing in the movie trailer. For example, the ad may be dynamically selected based on the user's behavior, preferences, etc., or other factors (e.g., product placement, etc.). In this way, the insertion of the ad may be customized based on the user (e.g., the user is identified), the content being viewed at the time, the merchandising strategy of DMR 130, the user's behavior, the user's usage patterns, the user's self-identified attributes, etc. In this example, the user may be interested in the sunglasses and interacts with the ad. The user may be automatically navigated to the DMR's 130 affiliated storefront that may be pre-populated with the details of the sunglasses and purchasing options. The user decides to purchase the sunglasses. Thereafter, the user is automatically navigated back to his/her home page of the content provisioner.

Figure 4:
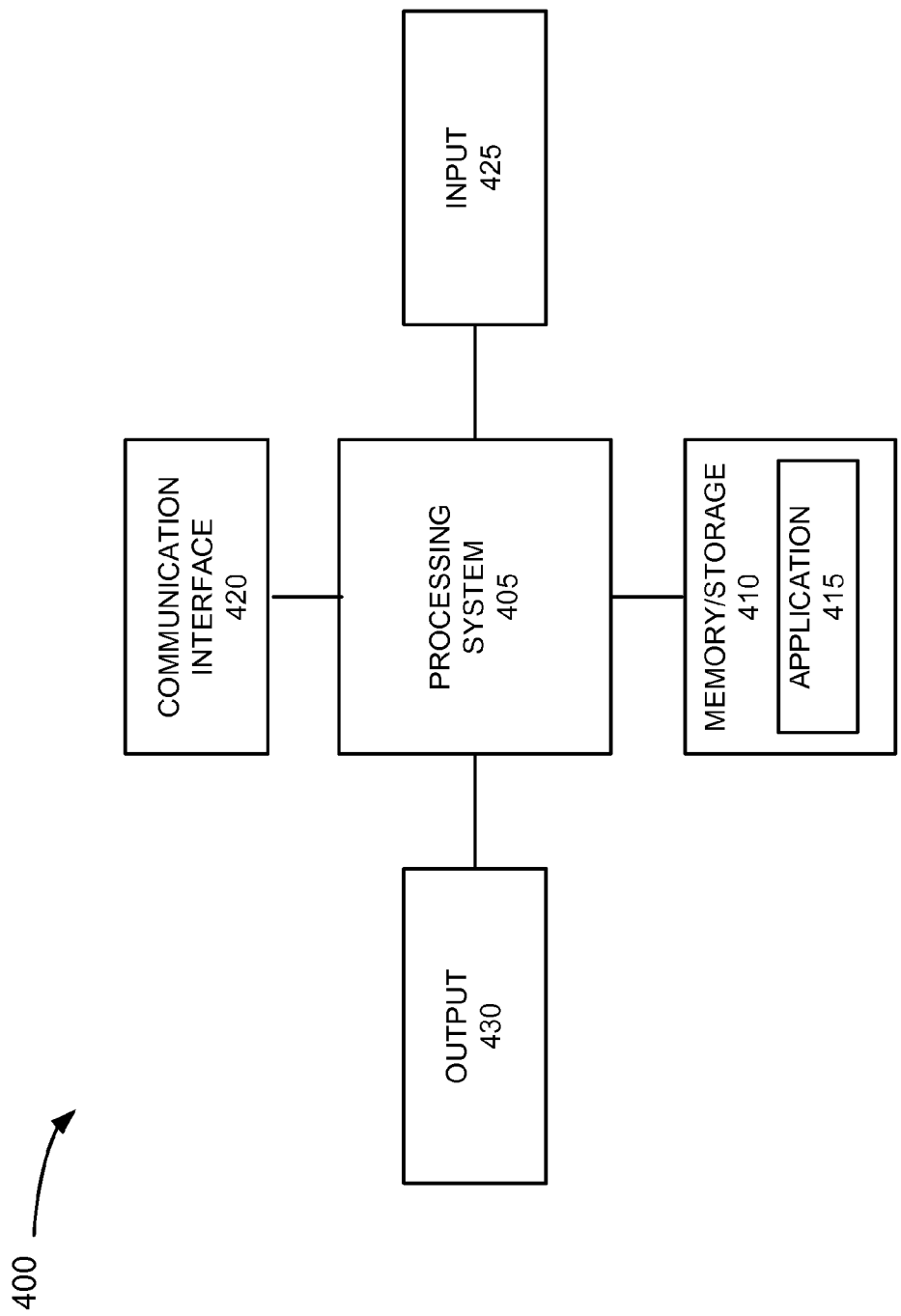
FIG. 4 is a diagram illustrating exemplary components of an exemplary embodiment of one or more devices illustrated in FIGS. 1-3.

FIG. 4 is a diagram illustrating exemplary components of a device 400 that may correspond to one or more of the devices in network 100 and environment 300. For example, device 400 may correspond to one or more devices pertaining to DDC 150, as well as one or more devices pertaining to content creator 110, advertiser 120, digital media retailer 130, consumer 140, network device 310, and/or user device 315.

As illustrated, according to an exemplary embodiment, device 400 may include a processing system 405, memory/storage 410 including an application 415, a communication interface 420, an input 425, and an output 430. According to other embodiments, device 400 may include fewer components, additional components, different components, and/or a different arrangement of components than those illustrated in FIG. 4 and described herein.

Processing system 405 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component or logic that may interpret and/or execute instructions and/or data. Processing system 405 may control the overall operation or a portion of operation(s) performed by device 400. Processing system 405 may perform one or multiple operations based on an operating system and/or various applications (e.g., application 415). Processing system 405 may access instructions from memory/storage 410, from other components of device 400, and/or from a source external to device 400 (e.g., a network, another device, etc.).

Memory/storage 410 may include one or multiple memories and/or one or multiple other types of storage devices. For example, memory/storage 410 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 410 may include a hard disk (e.g., a magnetic disk, an optical disk, a magneto-optic disk, a solid state disk, etc.) or some other type of storing medium, along with a corresponding drive. Memory/storage 410 may be external to and/or removable from device 400, such as, for example, a Universal Serial Bus (USB) memory, a dongle, a hard disk, mass storage, off-line storage, etc.

The term "computer-readable medium," as used herein, is intended to be broadly interpreted to include, for example, a memory, a storage medium, a CD, a DVD, a Blu-ray disc, or another type of tangible storing medium. Memory/storage 410 may store data, application(s), and/or instructions related to the operation of device 400.

Application 415 may include software that provides various services and/or functions. For example, with reference to user device 315 and according to an exemplary embodiment, application 415 may include one or multiple applications pertaining to the content provisioner. Additionally, for example, with reference to network device 310 and according to an exemplary embodiment, application 415 may include one or multiple applications pertaining to the content provisioner.

Communication interface 420 may permit device 400 to communicate with other devices, networks, systems, etc., illustrated in network 100. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 430 may permit an output from device 400. For example, output 430 may include a speaker, a display, a light, an output port, and/or some other type of visual, auditory, tactile, etc., output component.

As described herein, device 400 may perform processes in response to processing system 405 executing software instructions (e.g., application 415) stored by memory/storage 410. By way of example, the software instructions may be read into memory/storage 410 from another memory/storage 410 or from another device via communication interface 420. The software instructions stored by memory/storage 410 may cause processing system 405 to perform one or more processes described herein. Alternatively, for example, according to other implementations, device 400 may perform one or more processes described herein based on the execution of hardware (processing system 405, etc.), the execution of hardware and firmware, or the execution of hardware, software, and firmware.

Figure 5:
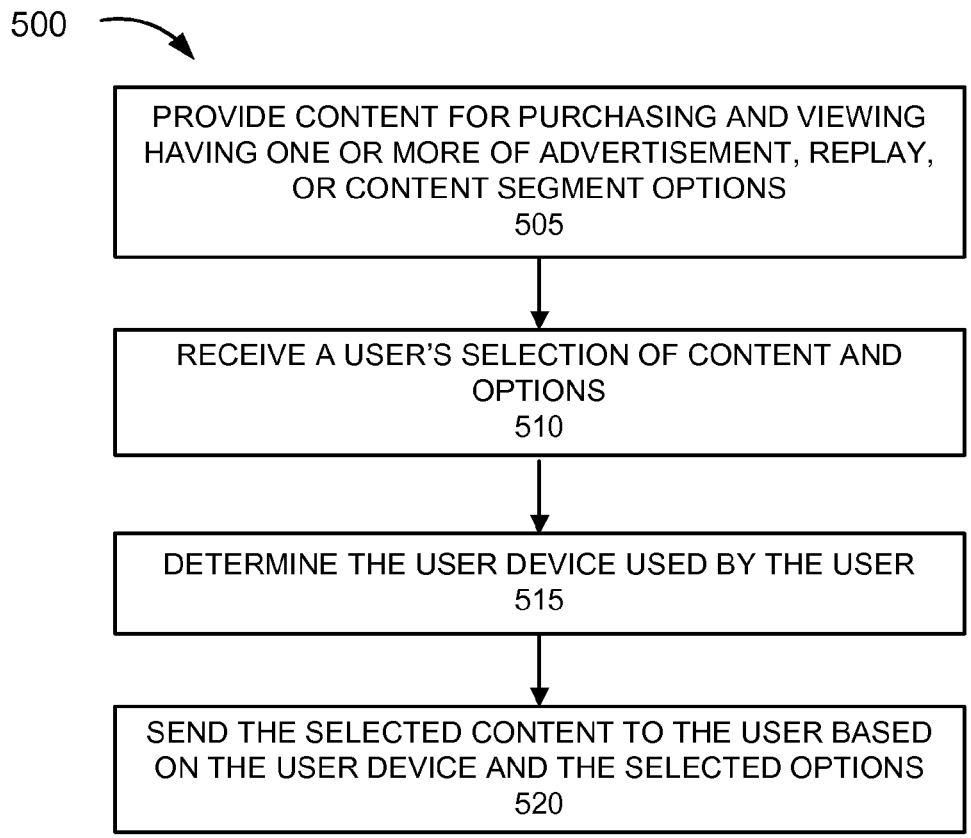
FIG. 5 is a flow diagram illustrating an exemplary process for providing content to a user.

FIG. 5 is a flow diagram illustrating an exemplary process 500 for providing content to a user. According to an exemplary embodiment, process 500 may be performed by the content provisioner.

Process 500 may begin with providing content for purchasing and viewing having one or more of advertisement, replay, or content segment options (block 505). For example, as previously described, a content provisioner of network device 310 may provide a selection of content that may be purchased and viewed by a user via a content provisioner of user device 315. According to an exemplary embodiment, the content provisioner of network device 310 may offer advertisement, replay, and/or content segment options pertaining to content. For example, as previously described, the advertisement option may provide for the ability of the user to view the content without ads, with ads, with a survey, without a survey, etc. Additionally, for example, the replay option may provide for the ability of the user to replay the content or not replay the content. For example, the replay option may specify the number of times the content may be replayed (e.g., once, twice, unlimited, etc.) and/or within a particular time period (e.g., within a day, a week, no limit, etc.). Additionally, the content segment option may provide for the ability of the user to purchase and view a portion of a content, a condensed version of a content, or a summary of a content. For example, the portion of the content may correspond to a particular time window of the content that is less than the entire content. The condensed version of the content may include, for example, a shortened version of the content. The summary of the content may correspond to a shortened version of the content that recaps the content. The content provisioner of network device 310 may provide appropriate pricing options corresponding to the content and the options selected by a user.

A user's selection of content and options may be received (block 510). For example, a user may provide his/her selection of content and options to the content provisioner via user device 315.

The user device used by the user may be determined (block 515). For example, the content provisioner may automatically determine (or identify) the user device used by the user to view the content selected based on a launching of the content provisioner associated with user device 315, a user's login with the content provisioner, and/or other device-specific parameters (e.g., device identifier, telephone number, MAC address, etc.). Based on determining (or identification of) the user device, the content provisioner may also determine parameters pertaining to the viewing of the content, such as, for example, resolution of the content, connection capacity, etc.

The selected content may be sent to the user based on the user device and the selected options (block 520). For example, the content provisioner may send the selected content based on the user device 315 used by the user and the selected options.

Although FIG. 5 illustrates exemplary operations for providing content to users, according to other exemplary embodiments, process 500 may include additional operations, fewer operations, and/or different operations than those illustrated and described.

Figure 6A:
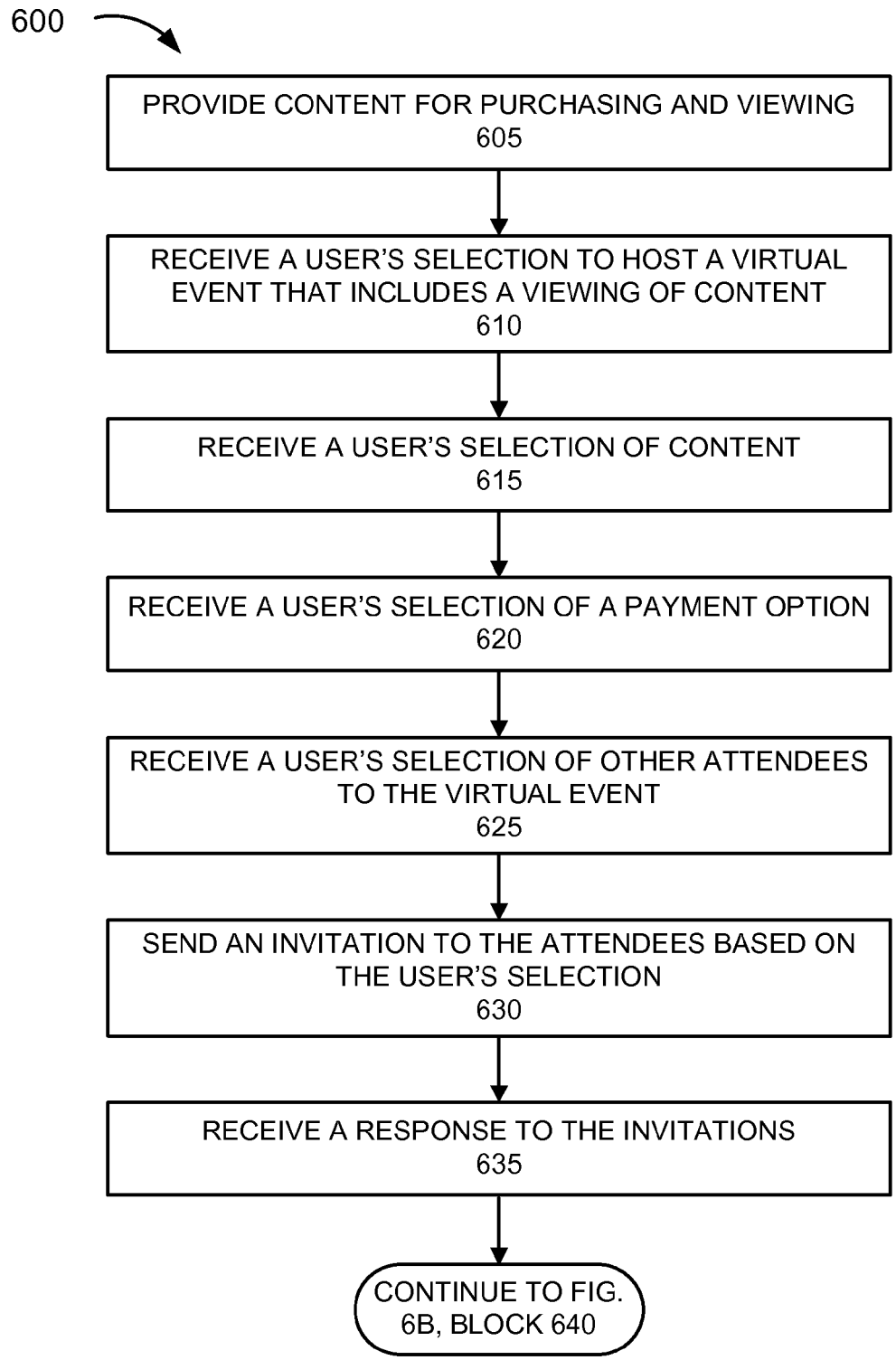
FIGS. 6A and 6B are flow diagrams illustrating an exemplary process for hosting a virtual event pertaining to content.
Figure 6B:
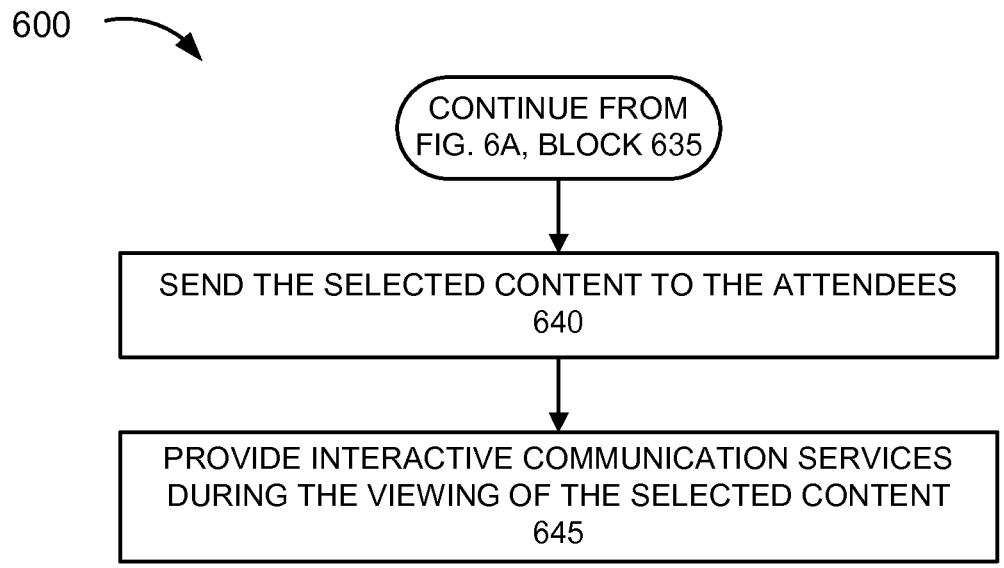

FIGS. 6A and 6B are flow diagrams illustrating an exemplary process for hosting a virtual event pertaining to content. According to an exemplary embodiment, process 600 may be performed by the content provisioner.

Process 600 may begin with providing content for purchasing and viewing (block 605). For example, as previously described, a content provisioner of network device 310 may provide a selection of content that may be purchased and viewed by a user via a content provisioner of user device 315.

A user's selection to host a virtual event that includes a viewing of content may be received (block 610). For example, as previously described, a user may elect to host a virtual event that includes the viewing of content with other users.

A user's selection of content may be received (block 615). For example, the content provisioner may receive the user's selection of content that may be viewed during the virtual event. The content may or may not be content that one or more attendees of the virtual event may be authorized to receive absent an invitation and acceptance to the virtual event. For example, if the content corresponds to content associated with a premium channel, an attendee that does not subscribe to the premium channel may view the content during the virtual event.

A user's selection of a payment option may be received (block 620). For example, the content provisioner may receive the user's selection pertaining to payment options associated with hosting the virtual event. As an example, the payment options may include the host (i.e., the user) paying for the virtual event, each attendee paying for the virtual event, or some other payment arrangement (e.g., a free event, etc.).

A user's selection of other potential attendees to the virtual event may be received (block 625). For example, the content provisioner may receive the user's selection of other attendees to be invited to the virtual event. For example, the other potential attendees may correspond to the user's friends, relatives, etc, that may be interested in viewing the selected content.

An invitation to the other potential attendees may be sent based on the user's selection (block 630). For example, the content provisioner may provide the user with the ability to author an invitation to the other potential attendees to participate in the virtual event. Alternatively, the content provisioner may automatically generate an invitation. The invitation may correspond to an SMS message, an MMS message, an email, an IM message, etc. The content provisioner may send the invitation to the selected potential attendees. According to an exemplary embodiment, the content provisioner of user device 315 may include a messaging module for sending and receiving messages. According to such an embodiment, the invitation may be sent to each other user's messaging module of the content provisioner of user device 315. Alternatively, the invitation may be sent to other messaging accounts and/or posted to the potential attendee's social networking account (e.g., Facebook, Twitter, etc.).

A response to the invitations may be received (block 635). For example, the content provisioner may receive responses from the other potential attendees pertaining to the invitation. The content provisioner and the user hosting the virtual event may then identify the participants in the virtual event.

The selected content may be sent to the attendees (block 640). For example, at a scheduled day and time associated with the virtual event, the content provisioner may send the selected content to each user via user device 315. For example, the content provisioner may determine which users (e.g., the host, the other attendees that accepted the invitation, etc.) have logged-in and/or are ready to receive the selected content.

Interactive communication services may be provided during the viewing of the selected content (block 645). For example, the content provisioner may provide real-time interactive communication services between the users during the virtual event. For example, the content provisioner may provide a video chat window or a text chat box to permit the users (e.g., the attendees) to communicate during the viewing of the content. Additionally, or alternatively, the content provisioner may automatically generate a message that indicates the user's attendance to or presence at the virtual event, as well as other details (e.g., content being viewed, users attending, start and end times of virtual event, etc.), and post the message to the user's social networking account.

Although FIGS. 6A and 6B illustrate exemplary operations for hosting a virtual event pertaining to content, according to other exemplary embodiments, process 600 may include additional operations, fewer operations, and/or different operations than those illustrated and described. For example, according to an exemplary embodiment, the content provisioner may recommend content for the virtual event based on the user's selection of attendees. For example, the content provisioner may select content that may be interesting for all potential participants of the virtual event based on each user's behavior, content viewed, etc. The content provisioner may present its recommendations to the user (e.g., the host) and other potential attendees within an invitation, etc., or during the setup of a virtual event with the host user. Additionally, or alternatively, the content provisioner may recommend other content to the attendees after the viewing of a virtual event based on each user's behavior, etc., as a way to continue the virtual event or promote another virtual event at a later time.

Figure 7:
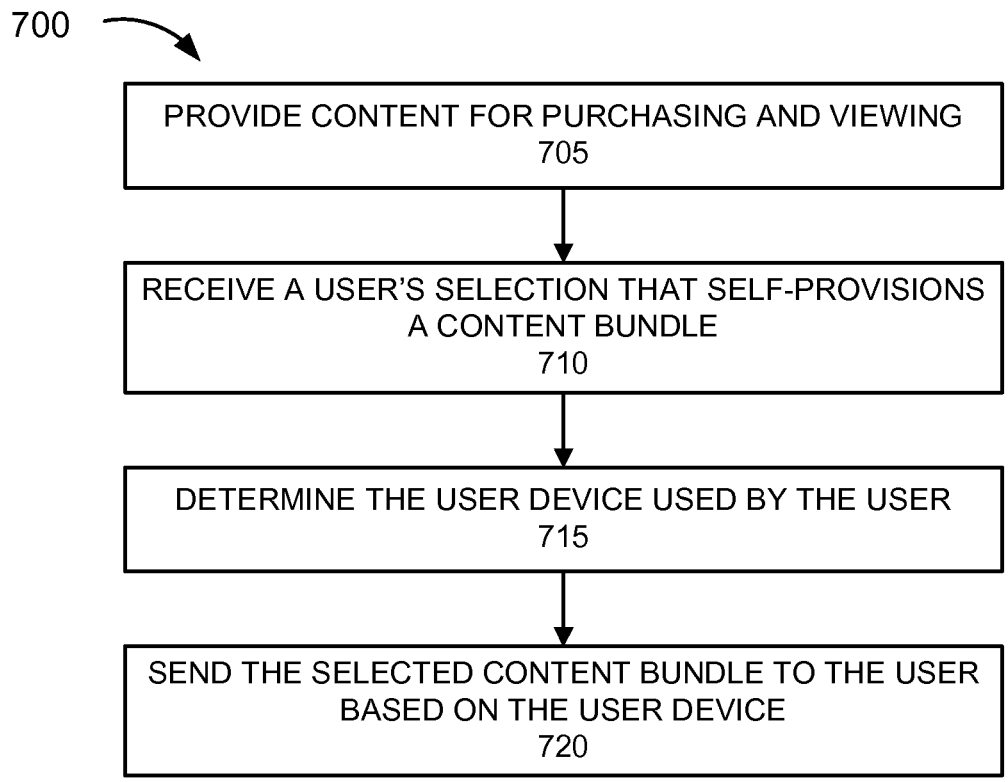
FIG. 7 is a flow diagram illustrating an exemplary process for providing content to a user.

FIG. 7 is a flow diagram illustrating an exemplary process for providing content to a user. According to an exemplary embodiment, process 700 may be performed by the content provisioner.

Process 700 may begin with providing content for purchasing and viewing (block 705). For example, the content provisioner of network device 310 may provide a selection of content that may be purchased and viewed by a user via a content provisioner of user device 315.

A user's selection that self-provisions a content bundle may be received (block 710). For example, as previously described, a user may self-provision a content bundle (e.g., combinations of content, combinations of channels, etc.) similar to that of a standard television service. In this way, the user may not unnecessarily purchase content that is included with a particular channel, pre-defined bundle, package, etc.

The user device used by the user may be determined (block 715). For example, the content provisioner may automatically determine the user device used by the user to view the content selected based on a launching of the content provisioner associated with user device 315, a user's login with the content provisioner, and/or other device-specific parameters (e.g., device identifier, telephone number, MAC address, etc.). Based on determining the user device, the content provisioner may also determine parameters pertaining to the viewing of the content, such as, for example, resolution of the content, connection capacity, etc.

The selected content bundle may be sent to the user based on the user device (block 720). For example, the content provisioner may send the selected content based on the user device 315. For example, the content provisioner may determine the appropriate format, resolution, etc., based on the identified or determined user device 315.

Although FIG. 7 illustrates exemplary operations for providing content to users, according to other exemplary embodiments, process 700 may include additional operations, fewer operations, and/or different operations than those illustrated and described.

In the foregoing description, users may be afforded access to a repository of content under one subscription service. The content may be purchased (e.g., owned, rented) and viewed using various user devices. The subscription service may manage the storage of all content purchased, provide various personalized services, and allow the user a versatility in selecting and viewing content, etc.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

While a series of blocks have been described with regard to exemplary processes illustrated in FIGS. 5, 6A, 6B, and 7, the order of the blocks may be modified according to other embodiments. In addition, non-dependent blocks may be performed parallel. Furthermore, other processes described in this description may be modified and/or non-dependent operations may be performed in parallel.

The exemplary embodiments described herein may be implemented in many different forms of software, firmware, and/or hardware. For example, a process or a function may be implemented as "logic" or as a "component." This logic or this component may include, for example, hardware (e.g., processing system 405, etc.), a combination of hardware and software (e.g., applications 415), a combination of hardware and firmware, or a combination of hardware, firmware, and software. The embodiments have been described without reference to a specific software code, a specific hardware or circuit configuration, etc., since the logic or the component can be designed to implement the embodiments based on the description herein.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction described in the specification and/or drawings should be construed as critical or essential to the exemplary embodiments described herein unless explicitly described as such.

What is claimed is:

1. A method performed by a network device, comprising:
providing, via a graphic user interface (GUI) of a first user device among one or more user devices associated with a user, a first opportunity to select media content;
providing, via the GUI of the first user device, a second opportunity to select one of media content segment options pertaining to the selected media content, wherein the media content segment options include purchasing and viewing of a portion, a condensed version, or a summary of the selected media content;
receiving a selection of the media content from the first user device;
receiving a selection of one of the media content segment options pertaining to the selected media content from the first user device;
providing, via the GUI of the first user device, pricing options corresponding to the respective media content segment options;
automatically identifying a second user device, among the one or more user devices associated with the user, based on a parameter corresponding to the second user device, wherein the second user device is currently associated with the user;
receiving, via the GUI of the first device, a payment of a fee corresponding to the selected media content segment option;
sending the one of the portion, the condensed version, or the summary of the selected media content to the identified second user device; and
allowing the identified second user device to display the one of the portion, the condensed version, or the summary of the selected media content on the identified second user device based on the selection of the media content segment option and the payment of the fee.

2. The method of claim 1, further comprising: providing, to the first user device, an opportunity to select a survey option pertaining to the selected media content,
wherein the survey option permits the identified second user device to display the selected media content with or without a survey.

3. The method of claim 1, further comprising:
generating personalized content recommendations based on at least one of the user's behavior, the user's usage patterns, or the user's self-identified attributes determined from the one or more user devices, and
providing the personalized content recommendations to one of the one or more user devices,
wherein the one or more user devices include at least one of a television, a mobile device, or a computer.

4. The method of claim 1, further comprising:
receiving a selection, from a host user device which is one of the one or more user devices, to host a virtual event;
receiving a selection that identifies other users to be invited to the virtual event;
receiving a selection pertaining to a purchase of media content to be viewed during the virtual event;
sending an invitation message to other user devices associated with the respective other users, wherein the invitation message indicates an invitation to the virtual event;
receiving a response to the invitation message from each of the other user devices; and
sending the media content to be viewed during the virtual event to each of the other user devices, when the response includes an acceptance of the invitation to the virtual event, and to one of the one or more user devices.

5. The method of claim 4, further comprising:
providing, to the user, a third opportunity to select one of payment options including at least one of a pay-your-own way option, a host-pay option, a special offer option,
wherein the pay-your-own way option requires each of the other users to pay a fee to join the virtual event,
the host-pay option requires the user to pay for the other users' joining the virtual event, and
the special offer option permits the other users to view the media content to be viewed in the virtual event in response to at least one of viewing an advertisement, or participating in a survey.

6. The method of claim 1, further comprising:
automatically posting a status update message to a social networking site associated with the user when the identified second user device begins playing the selected media content.

7. The method of claim 1, further comprising:
receiving an input from the user to pause a playing of the selected media content on the identified second user device;
receiving an input from the user to play, on a third user device associated with the user, the selected media content from a pausing point associated with the input on the identified second user device, wherein the third user device is different from the identified second user device;
identifying that the third user device is associated with the user, based on a parameter corresponding to the third user device; and
permitting the third user device to play the selected media content from the pausing point on the third user device.

8. The method of claim 1, wherein the selected media content corresponds to media content that is self-provisioned by the user.

9. The method of claim 1, further comprising:
automatically determining a dissatisfaction of the user pertaining to the selected media content based on a time period in which the selected media content is played by the identified second user device.

10. A system comprising:
one or more memories to store instructions; and
one or more processors to execute the instructions that cause the one or more processors to:

provide, via a graphic user interface (GUI) of a first user device among one or more user devices associated with a user, a first opportunity to select media content for purchasing and viewing;

provide, via the GUI of the first user device, a second opportunity to select one of media content segment options pertaining to the selected media content, wherein the media content segment options include purchasing or viewing of a portion, a condensed version, or a summary of the selected media content;

receive a selection of the media content from the first user device;

receive a selection of one of the media content segment options pertaining to the selected media content from the first user device;

provide, via the GUI of the first user device, pricing options corresponding to the respective media content segment options;

automatically identify a second user device, among the one or more user devices, used by the user for viewing the selected media content, based on a parameter corresponding to the second user device;

receive, via the GUI of the first device, a payment of a fee corresponding to the selected media content segment option;

send the one of the portion, the condensed version, or the summary of the selected media content to the determined second user device; and allow the determined second user device to display the one of the portion, the condensed version, or the summary of the selected media content to the user on the determined second user device based on the selection of the media content segment option and the payment of the fee.

11. The system of claim 10, wherein the one or more processors are further to execute the instructions that cause the one or more processors to: provide, to the first user device, an opportunity to select a survey option pertaining to the selected media content, wherein the survey option permits the determined second user device to display the media content with or without a survey.

12. The system of claim 10, wherein the one or more processors are further to execute the instructions that cause the one or more processors to:

receive a selection, from a host user device which is one of the one or more user devices, to host a virtual event;

receive a selection, from the host user device, indicating other users to be invited to the virtual event;

receive a selection, from the host user device, pertaining to a purchase of media content to be viewed during the virtual event;

automatically generate an invitation message indicating an invitation of attending the virtual event;

send the invitation message to user devices associated with the respective other users;

receive a response to the invitation message from each of the other user devices, wherein the response indicates if each of the other users will attend the virtual event; and send the media content to be viewed during the virtual event to each other user device associated with each user that indicated acceptance of attending the virtual event and one of the one or more user devices associated with the user.

13. The system of claim 10, wherein the one or more processors are further to execute the instructions that cause the one or more processors to:

identify the user;

generate content recommendations based on the identifying of the user and at least one of the user's behavior, the user's usage patterns, or the user's self-identified attributes determined from the one or more user devices associated with the user to purchase and view media content; and provide the content recommendations to the first user device, wherein the one or more user devices includes at least one of a television, a mobile device, or a computer.

14. The system of claim 13, wherein the one or more processors are further to execute the instructions that cause the one or more processors to:

provide an opportunity to select an advertisement option;

dynamically insert an advertisement with respect to the selected media content when the advertisement option is selected, and wherein a selection of the advertisement that is dynamically inserted is based on the identifying of the user and at least one of the user's behavior, the user's usage patterns, or the user's self-identified attributes; and permit the determined second user device to display the advertisement with the selected media content on the determined second user device.

15. The system of claim 10, wherein when sending one of the portion, the condensed version, or the summary of the selected media content to the second user device, the one or more processors are further to execute the instructions that cause the one or more processors to:

automatically detect a network connection capacity for sending the selected media content to the determined second user device; and automatically select a resolution for the selected media content that is compatible with the network connection capacity.

16. The system of claim 10, wherein the one or more processors are further to execute the instructions that cause the one or more processors to:

receive a selection, from one of the one or more user devices, of a ranking pertaining to the selected media content;

automatically generate a recommendation message based on the ranking; and automatically post the recommendation message to one or more social networking sites associated with one or more other users.

17. A non-transitory computer-readable medium comprising computer-executable instructions for execution by at least one processor, the instructions causing the at least one processor to:

provide, via a graphic user interface (GUI) of a first user device among one or more user devices associated with a user, a first opportunity to select media content for purchasing and viewing;

provide, via the GUI of the first user device, a second opportunity to select one of media content segment options pertaining to the selected media content, wherein the media content segment options include purchasing or viewing of a portion, a condensed version, or a summary of the selected media content;

receive a selection of the media content from the first user device;

receive a selection of one of the media content segment options pertaining to the selected media content from the first user device;

automatically identify a second user device, among the one or more user devices, used by the user for viewing the selected media content;

send the selected media content to the identified user device;

allow the identified second user device to display the selected media content on the identified second user device based on the selection of the one of the media content segment options, receive an input to pause a playing of the selected media content on the identified second user device;

receive an input to play, on a third user device associated with the user, the selected media content from a pausing point associated with the input on the identified second user device, wherein the third user device is different from the identified second user device; and permit the third user device to play the selected media content from the pausing point on the third user device, wherein the media content segment options permit the identified second user device to purchase or rent, and view a portion of the media content, a condensed version of the media content, or a recap of the media content, and wherein the media content corresponds to video content.

18. The non-transitory computer-readable medium of claim 17, wherein the instructions further cause the at least one processor to:

receive a selection, from a host user device which is one of the user devices, to host a virtual event;

receive a selection, from the host user device, identifying other users to be invited to the virtual event;

receive a selection, from the host user device, pertaining to a purchase of the media content to be viewed during the virtual event;

automatically generate an invitation message indicating an invitation to the virtual event;

send the invitation message to user devices associated with the respective other users;

receive a response to the invitation message from each of the other user devices, wherein the response indicates whether each of the other users will be attending the virtual event; and send the media content to be viewed during the virtual event to each other user device associated with each user that accepted to attend the virtual event and one of the user devices associated with the user.

19. The non-transitory computer-readable medium of claim 17, wherein the instructions further causes the at least one processor to: provide, to the first user device, an opportunity to select a survey option pertaining to the purchasing or renting, and the viewing of the media content, wherein the survey option permits the identified second user device to display the media content with or without a survey.

20. The non-transitory computer-readable medium of claim 17, wherein the instructions further cause the at least one processor to:

automatically determine a dissatisfaction of the user pertaining to the selected media content based on a time period in which the selected media content is played by the identified second user device;

display a message requesting confirmation from the user whether the user is dissatisfied with the selected media content; and display a message indicating that the user can obtain a refund associated with a cost of the selected media content when the user confirms the user's dissatisfaction with the selected media content.

\* \* \* \* \*